United States Patent

[11] 3,586,373

| [72] | Inventor | Willi Reidelbach |
| | | Sindelfingen, Germany |
| [21] | Appl. No. | 826,340 |
| [22] | Filed | May 21, 1969 |
| [45] | Patented | June 22, 1971 |
| [73] | Assignee | Daimler-Benz Aktiengesellschaft |
| | | Stuttgart-Unterturkheim, Germany |
| [32] | Priority | May 21, 1968 |
| [33] | | Germany |
| [31] | | P 17 55 539.4 |

[54] ARRANGEMENT FOR THE ANCHORING OF SAFETY BELTS IN MOTOR VEHICLES
7 Claims, 1 Drawing Fig.

[52] U.S. Cl. .................................................. 297/389,
[51] Int. Cl. .................................................. A62b 35/60

[50] Field of Search ............................................ 297/389,
385, 384, 386, 387, 390; 280/150 SB; 244/122;
248/429, 430

[56] References Cited
UNITED STATES PATENTS

| 2,312,946 | 3/1943 | Watter .......................... | 297/389 |
| 3,204,916 | 9/1965 | Pickels .......................... | 248/439 |
| 3,243,233 | 3/1966 | Davis............................. | 297/389 |
| 3,442,529 | 5/1969 | Lewis et al..................... | 297/388 |
| 3,456,981 | 7/1969 | Radke et al.................... | 297/389 |

*Primary Examiner*—James T. McCall
*Attorney*—Craig, Antonelli, Stewart & Hill

ABSTRACT: An anchoring arrangement for a safety belt, especially a Three-point safety belt, in which the lower end or ends are anchored at the seat frame whereas the upper end is secured at a lateral wall of the body.

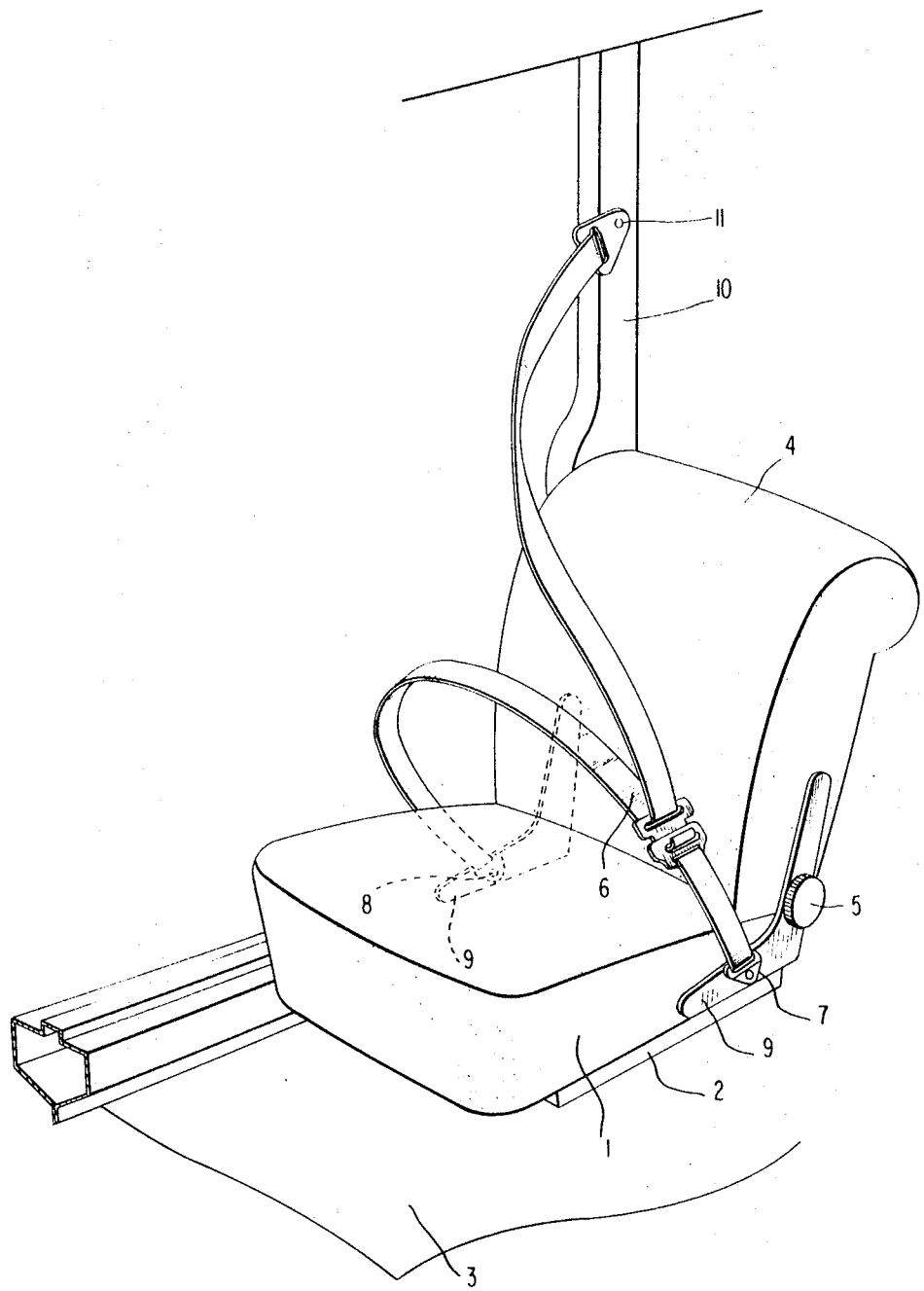

ARRANGEMENT FOR THE ANCHORING OF SAFETY BELTS IN MOTOR VEHICLES

The present invention relates to an arrangement for the anchoring of safety belts, especially of three-point belts, in motor vehicles, preferably in passenger motor vehicles with an adjustable seat.

Safety belts should have a predetermined position relative to the body of the passenger to be held or retained by the safety belt. If the anchoring means are rigidly arranged at the vehicle body, for example, welded thereto, then the relative position changes depending on the position of the adjustable seat. In order to obtain a relative position independent of the position of the seat, it has become known to build or install the anchoring means into the seat frame. The seat frame then has to be so constructed that it withstands the loads to be absorbed by the safety belt during an accident as well as also further transmits these loads by way of the seat brackets or mounts to the vehicle body floor. This requirement leads to expensive and heavy seat frame constructions and jeopardizes the possibility to adjust the inclination of the backrest.

The present invention is concerned with the aim to eliminate these disadvantages and to so arrange and construct the anchoring means for safety belts of the aforementioned type that the relative position of the belt remains far reachingly uninfluenced by the position of the seat and relative lightweight seat frames with the known installations for changing the backrest inclination can be continued to be used. The present invention essentially consists in that the lower end or ends of the safety belt are anchored at the seat frame whereas the upper end is secured in a conventional manner at the sidewall of the body. By this type of securing, a correct fit of the hip belt part, especially with a three-point belt, is assured whereas with an adjustment of the seat, the position of the shoulder belt part changes only very little and always remains within the permissive area.

Appropriately, the anchoring means of the lower belt end or ends are arranged at the base portion of the seat frame. It is thereby extraordinarily advantageous if the anchoring of the lower belt end or ends has as small as possible a vertical distance to the adjusting mechanism of the seat. If the distance to the adjusting mechanism is small, then the forces to be absorbed by the safety belt in case of an accident can be transmitted without the occurrence of larger moments rectilinearly to the adjusting mechanism and thereupon to the bracket or mount and the vehicle body floor.

Accordingly, it is an object of the present invention to provide an arrangement for the anchoring of safety belts in motor vehicles which eliminates by simple means the aforementioned shortcomings and drawbacks encountered in the prior art.

Another object of the present invention resides in an arrangement of the anchoring means for safety belts in passenger motor vehicles which is not only relatively simple in construction and devoid of excessive expenditures but also preserves the possibility of inclining the backrest of the seat with conventional, presently used means.

A further object of the present invention resides in safety belts for motor vehicles of the aforementioned type which are relatively unaffected by any adjustments of the seat.

These and further objects, features, and advantages of the present invention will become more obvious from the following description when taken in connection with the accompanying drawing which shows, for purposes of illustration only, one embodiment in accordance with the present invention, and wherein:

The single FIGURE is a perspective view of one embodiment of a safety belt anchoring in accordance with the present invention.

Referring now to the single FIGURE of the drawing, the portion of a passenger motor vehicle illustrated in this FIGURE includes the right from seat 1 which is adjustably arranged in the longitudinal direction in a conventional manner on a bracket or mount 2 of the vehicle floor 3. Also, the inclination of the backrest 4 is adjustable by a separate conventional adjusting mechanism 5. A three-point safety belt 6 is provided for this seat.

In order to achieve that the once-adjusted relative position of the safety belt 6 in relation to the seat 1 and to the person seated therein is not changed during an adjustment of the seat, the two lower anchoring means 7 and 8 of any conventional type are arranged at the base portions 9 of the seat frame. In this manner, a correct fit of the hip belt portion is assured, independently of the position of the seat 1 adjustable in the longitudinal direction of the vehicle. The upper end of the safety belt 6 is then secured in a conventional manner at the sidewall of the body, for example, at the door column 10. By this arrangement of the upper anchoring means 11 the position of the shoulder belt part changes only very little during an adjustment of the seat 1 and always remains within the permissive limits.

It is achieved by the special type of fastening of the safety belt 6 that a relatively light weight seat frame can be used which, nevertheless, safely absorbs the forces occurring during an accident and transmits the same to the bracket or mount 2 of the vehicle floor 3. It is thereby particularly appropriate if the lower anchoring means 7 and 8 are arranged approximately at the height of the adjusting mechanism (not shown) of any conventional type of the seat 1, because in that case the forces to be absorbed in the vehicle longitudinal direction by the hip belt portion in case of an accident can be transmitted without the formation of larger moments directly to the bracket or mount 2. Since the anchoring of the safety belt 6 takes place independently of the backrest 4 of the seat 1, the backrest 4 can be adjusted to any desired inclination by means of the conventional adjusting mechanism 5.

While I have shown and described only one embodiment in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are within the scope of those skilled in the art.

I claim:

1. An arrangement for the anchoring of safety belts in motor vehicles, particularly in passenger motor vehicles with an adjustable seat, characterized in that the lower end of the safety belt is anchored by anchoring means at a seat frame means whereas the upper end of the safety belt is secured at a sidewall of the vehicle body.

2. An arrangement for the anchoring of safety belts according to claim 1, characterized in that the safety belt is a three-point safety belt whose two lower ends are anchored by anchoring means at the seat frame means.

3. An arrangement according to claim 2, characterized in that the anchoring means of each lower belt end is arranged at a base portion of the seat frame means.

4. An arrangement according to claim 3, in which the seat has adjusting means for enabling adjustment thereof in the longitudinal direction, characterized in that the anchoring means of each lower belt end has as small as possible a vertical distance to the adjusting means of the seat.

5. An arrangement according to claim 1, characterized in that the anchoring means of the belt end is arranged at a base portion of the seat frame means.

6. An arrangement according to claim 1, in which the seat has adjusting means for enabling adjustment thereof in the longitudinal direction, characterized in that the anchoring means of each lower belt end has as small as possible a vertical distance to the adjusting means of the seat.

7. An arrangement according to claim 6, characterized in that the anchoring means of each lower belt end is arranged at a base portion of the seat frame means.